(No Model.) 2 Sheets—Sheet 1.
H. BURGESS.
APPARATUS FOR RECOVERING ALKALI.
No. 438,772. Patented Oct. 21, 1890.
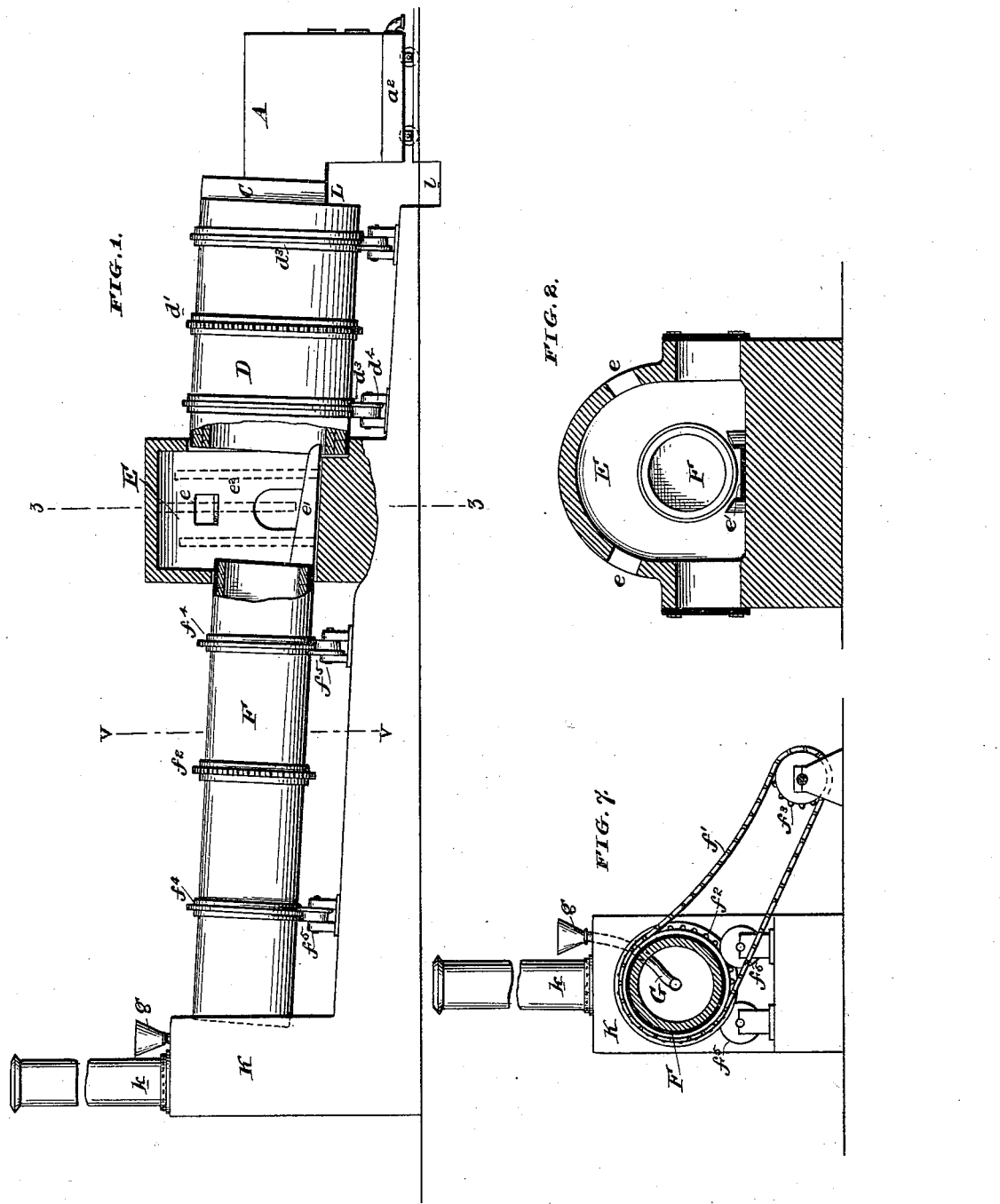

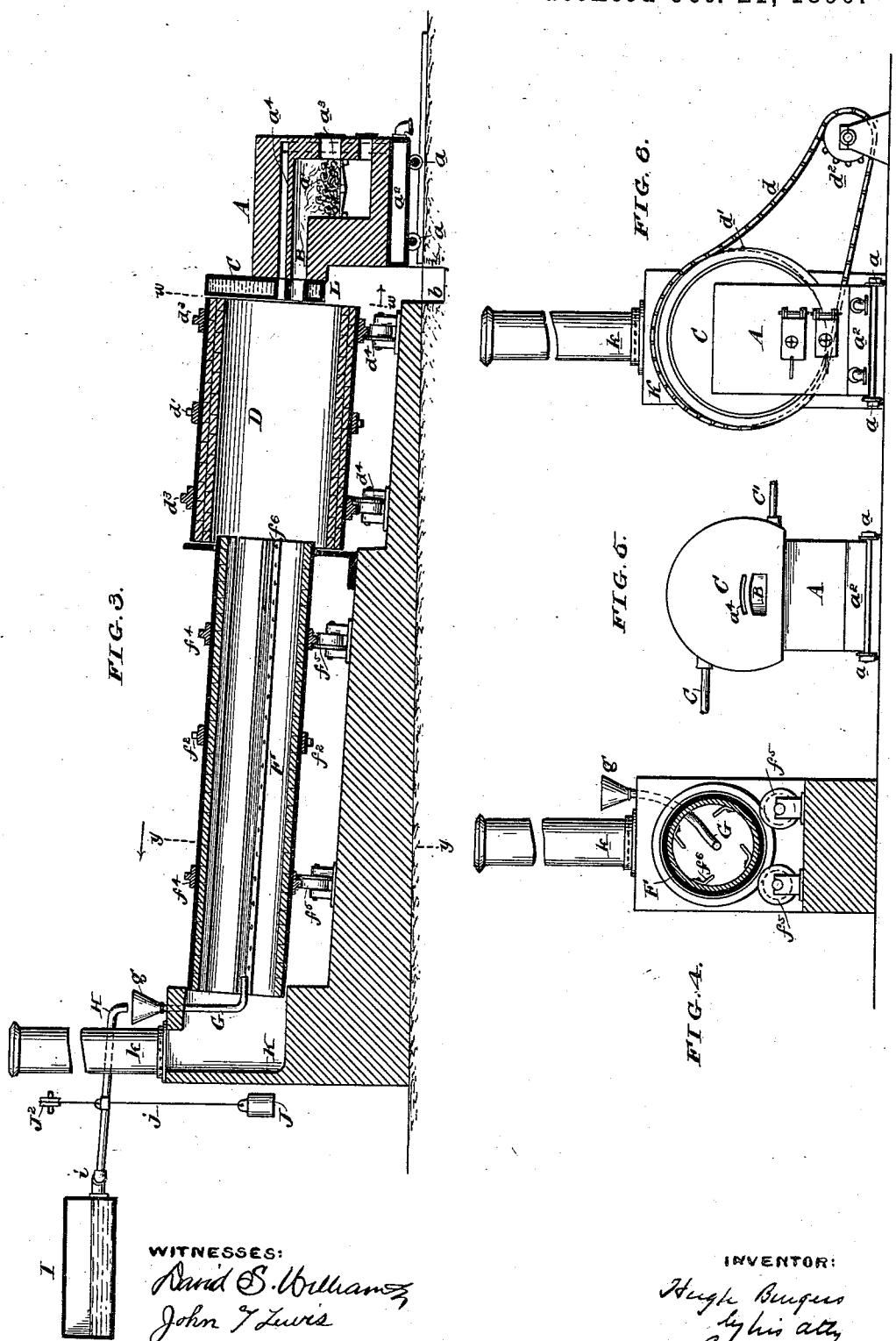

UNITED STATES PATENT OFFICE.

HUGH BURGESS, OF ARDMORE, PENNSYLVANIA.

APPARATUS FOR RECOVERING ALKALI.

SPECIFICATION forming part of Letters Patent No. 438,772, dated October 21, 1890.

Application filed April 25, 1889. Serial No. 308,585. (No model.)

*To all whom it may concern:*

Be it known that I, HUGH BURGESS, a subject of the Queen of Great Britain, and a resident of Ardmore, in the county of Montgomery and State of Pennsylvania, have invented a new and useful Improvement in Apparatus for Evaporating and Calcining Alkaline Solutions; and my invention consists in certain novel apparatus and combinations of apparatus, as will hereinafter more clearly appear.

Heretofore in the reclaiming of waste alkali from liquids or semi-liquids—such, for example, as reclaiming waste alkali from the spent liquids of pulp-mill digesters—the operation was accomplished by first evaporating the liquid in pans and then treating the semi-liquid so evaporated on an incinerating hearth of a rotating incinerator.

My invention consists in evaporating the spent liquid in a rotary evaporator, the liquid being subject to direct action of the heat, and then passing the semi-liquid directly from this rotary evaporator into a rotary incinerator, into which said evaporator opens directly, or a combustion-chamber may be interposed between the incinerator and evaporator and air admitted into said combustion-chamber, so that the gases generated in the incinerator by the combustion of the organic matter in the inspissated waste alkaline-liquor may be combined with a fresh accession of air in the combustion-chamber, and the heated products of combustion thus produced passed into a rotary evaporator.

In the drawings, Figure 1 is a side view showing the incinerator and evaporator with the intermediate combustion-chamber in section. Fig. 2 is a sectional end view on line $z$ $z$, Fig. 1, in the direction denoted by arrow. Fig. 3 is a longitudinal section showing the evaporator entering directly into the incinerator, the combustion-chamber being omitted. Fig. 4 is a sectional end view on line $y$ $y$, Fig. 3, in the direction denoted by arrow. Fig. 5 is a sectional end view on line $w\ w$, Fig. 3, in the direction denoted by arrow. Fig. 6 is an end view at the furnace end of the apparatus. Fig. 7 is a sectional view on line $v\ v$, Fig. 1, in the direction of arrow.

Similar letters denote similar parts.

A is the furnace carried by the wheels $a$, $a'$ being the fire-chamber. Beneath this fire-chamber is the air-inlet chamber $a^2$, which has a passage $a^3$, (shown in dotted lines, Fig. 3,) through which air is carried round the fire-chamber and highly heated, and passes out through the passage $a^4$ directly over the mouth of the flue B, which leads from the fire-chamber, so that the products of combustion of the furnace A are provided with a fresh supply of heated air to cause a more perfect combustion in the incinerator of the gases from the furnace A and those generated in the incinerator by the combustion of the organic matter in the inspissated mass.

C is a water-jacket, the water passing continuously through the pipe $c'$ and passing out through the pipe $c$, Fig. 5. The object of this water-jacket will be hereinafter more fully described. This water-jacket is secured permanently to the rear of the furnace A. As can be seen from the drawings, the flue B and the air-passage $a^4$ both pass through the water-jacket C.

D is a rotary vessel, preferably made cylindrical. This cylinder may be constructed of plate or cast iron, lined in the interior with fire-brick. This cylinder D is rotated by means of a sprocket-chain $d$, Fig. 6, operating upon the sprocket-wheel $d'$, surrounding said cylinder, and a sprocket-wheel $d^2$, connected with the source of power, gives motion to this chain. This cylinder has projecting bands $d^3$, which rest upon the anti-friction rolls or wheels $d^4$.

E is a combustion-chamber provided with air-openings $e$ and with an inclined trough $e'$. This chamber may have a smooth interior surface or be provided with baffling-walls $e^2$, as shown in dotted lines, Fig. 1. As may be seen from the drawings, the rear end of the cylinder D enters directly into this combustion-chamber.

F is a cylinder of smaller diameter and greater length than cylinder D. This cylinder is rotated by means of a sprocket-chain $f'$, operating the sprocket $f^2$, surrounding said cylinder F, and said chain is driven by a sprocket-wheel $f^3$, connected with the source of power. This cylinder F has the projecting bands $f^4$, which rest upon the friction pulleys or wheels $f^5$. This cylinder F may be constructed, as described for cylinder D, or may have in its interior a series of projecting blades $f^6$, Fig. 4, secured to the interior of the cylinder, the purpose of which will be hereinafter described.

G is a tube, Fig. 3, leading from the funnel $g$ to said cylinder F.

H is a pipe leading from the reservoir I to the funnel $g$. This pipe is hinged at $i$ and balanced by the weight J, connected to the cord $j$, which passes around the pulley $j^2$ and is connected to said pipe H, so that the spent liquor may be caused to flow in any desired amount by raising or depressing the pipe H, and the liquid-supply can be entirely stopped by elevating said pipe above the level of the liquid in the reservoir.

As shown in the drawings, F is the rotary evaporator, and D is the rotary incinerator.

K is a flue to carry off the products of combustion to the stack or chimney $k$. As may be seen from Fig. 1, the water-jacket C fits flush against the open end of the cylinder D when the furnace is in place.

The products of combustion from the furnace pass through the cylinder D, the combustion-chamber E, the cylinder F, and flue K and escape through stack or flue $k$.

The operation is as follows: The fire-brick or furnace A and water-jacket are brought to the face of the cylinder D, water passed through the water-jacket, and the cylinders D and F caused to rotate. The spent or other liquid to be treated is admitted through the funnel $g$ and pipe into the cylinder F, and the products of combustion passing through this cylinder, as hereinafter described, cause an evaporation of the water from the liquid, reducing it in specific gravity. The rotation of the evaporator F diffuses the liquid around the interior surface and brings it into contact with the heated gases passing through the evaporator. The blades $f^5$ may be used to more completely diffuse the liquid. The cylinder F is slightly inclined, as shown in the drawings, to cause the liquid to move slowly through it, and it is obvious that the same object can be attained if the exterior of the cylinder be a horizontal line and the interior slightly flaring. The liquid, greatly concentrated by the treatment in the rotatory evaporator F, falls into the incinerating-cylinder D either directly or after passing through the combustion-chamber E. The inspissation and incineration of the alkaline mass are completed in the incinerator D, and the solid residue is delivered at the open space below the water-jacket.

The object of the use of an intermediate combustion-chamber is as follows: The incineration of the material in the chamber D evolves a large amount of gases, and when these gases, highly heated, reach the chamber E the admitted air combines with these gases and completes the combustion and pass into and through the cylinder F.

The object of the water-jacket is as follows: When the furnace is not provided with a water-jacket, it radiates a large amount of heat at the furnace end of the incinerator, and when the incinerated material reaches the end of the incinerator where it passes out it is liable to become burned and sublimed, and the use of a water-jacket flush against the open end of said cylinder prevents a too great heat. The incinerated material passes out from the bottom of the incinerator D at the point L into the reservoir I, from which it can be removed for further use, as desired.

As has been hereinbefore stated, the evaporator may enter directly into the incenerator without the use of the combustion-chamber E, as shown in the drawings. The incinerator and evaporator are in line with each other; but they can be placed at any desired angle with each other, provided that the liquid from the evaporator is delivered to the incinerator. It is preferable, though not essential, that the incinerator and evaporator should be rotated at different speeds, the evaporator being the more rapidly-rotated cylinder.

I do not intend to limit myself to specific means for causing the cylinders to rotate. It is preferable that the incinerator should be of greater diameter than the evaporator. With some classes of liquids it is essential that the completion of the operation should take place farthest from the source of heat, in which case the apparatus will be reversed and the incinerator placed the farthest from the furnace A, while the evaporator will be the cylinder contiguous to said furnace.

I have shown one evaporating-cylinder; but it is evident that two or more may be used in the same apparatus if the reduction requires an increased number of cylinders.

I have described in this specification the use of my apparatus for the purpose of recovering waste alkaline matter from spent liquids produced in pulp-making; but it can be used with equal advantage for the recovery of any valuable solid matter from a liquid or semi-liquid.

I do not claim in this application the combination of a rotary evaporator and a rotary incinerator, said evaporator opening into said incinerator, whereby the liquid is increased in specific gravity in the evaporator and incinerated in the incinerator; nor do I claim in this application the combination of a rotary evaporator and a rotary incinerator with a combustion-chamber between said evaporator and said incinerator, both said evaporator and incinerator opening into said combustion-chamber, as these claims form the subject-matter and are specific claims in a certain application filed by me November 10, 1888, Serial No. 290,452.

Having now fully described my invention, what I claim, and desire to secure by Letters Patent, is—

In combination, an open-mouthed rotary cylinder, a furnace in front of the mouth of said cylinder, and a water-jacket interposed between the furnace and the mouth of said cylinder, the rear surface of said water-jacket being flush with the mouth of said rotary cylinder.

In testimony of which invention I have hereunto set my hand.

HUGH BURGESS.

Witnesses:
ERNEST HOWARD HUNTER,
ABNER J. DAVIS.